(12) United States Patent
Monti (10) Patent No.: US 8,689,525 B2
(45) Date of Patent: Apr. 8, 2014

(54) MACHINE FOR FILLING AND CAPPING VIALS

(75) Inventor: Giuseppe Monti, Pianoro (IT)

(73) Assignee: Marchesini Group S.p.A., Pianoro (Bologna) (IT)

( * ) Notice: Subject to any disclaimer, the term of this patent is extended or adjusted under 35 U.S.C. 154(b) by 419 days.

(21) Appl. No.: 13/156,822

(22) Filed: Jun. 9, 2011

(65) Prior Publication Data

US 2011/0302884 A1 Dec. 15, 2011

(30) Foreign Application Priority Data

Jun. 14, 2010 (IT) .............................. BO2010A0373

(51) Int. Cl.
*B65B 3/00* (2006.01)

(52) U.S. Cl.
USPC ............................. 53/281; 53/284.6; 53/287

(58) Field of Classification Search
USPC ............. 53/173, 266.1, 281, 282, 284.6, 287, 53/485; 198/349, 358, 370.01, 370.08; 177/52, 53, 62
See application file for complete search history.

(56) References Cited

U.S. PATENT DOCUMENTS

| | | | | |
|---|---|---|---|---|
| 4,344,493 A * | 8/1982 | Salmonsen et al. | ............... | 177/52 |
| 4,437,289 A * | 3/1984 | Bedin | ................................. | 53/64 |
| 4,888,936 A * | 12/1989 | Takahama et al. | ............... | 53/510 |
| 5,301,488 A * | 4/1994 | Ruhl et al. | ......................... | 53/55 |
| 5,806,287 A * | 9/1998 | Trechsel | ........................ | 53/502 |
| 7,549,275 B2 * | 6/2009 | Monti | ............................. | 53/502 |
| 7,726,352 B2 * | 6/2010 | Py et al. | ........................ | 141/11 |
| 2005/0150191 A1 * | 7/2005 | Taylor | ............................. | 53/471 |
| 2008/0223003 A1 * | 9/2008 | Monti | ............................. | 53/281 |

FOREIGN PATENT DOCUMENTS

| | | |
|---|---|---|
| DE | 2605775 A | 8/1977 |
| DE | 2008 007590 U | 10/2008 |
| DE | 10 2008 001287 A | 10/2009 |
| EP | 0340468 A | 11/1989 |
| EP | 0838275 A | 4/1998 |
| EP | 1988018 A | 4/2008 |
| EP | 1955949 A | 8/2008 |
| WO | WO01/88698 A | 11/2001 |

OTHER PUBLICATIONS

European Search Report for EP 2 394 915 A1,Completed Sep. 29, 2011, 3 pages.

* cited by examiner

*Primary Examiner* — Hemant M Desai
(74) *Attorney, Agent, or Firm* — William J. Sapone; Ware Fressola Maguire & Barber LLP (57) ABSTRACT

A machine (M) for filling and capping vials (F), comprising, arranged in a cascade fashion: a supply station (1) of empty vials (F); an Archimedes screw (2) having a rotation axis parallel to a longitudinal development of the machine (M), supplied with the vials (F) in arrival from the supply station (1); a device (D) for disengaging a predetermined number of vials (F) from the screw (2), activated in phase relation with the screw (2), and for transferring the vials (F) transversally; a comb conveyor (3), step-moved and designed to receive the predetermined number of vials (F) from the device (D); a filling station (6, 7), designed for introduction of a liquid solution contemporaneously into a plurality of vials (F); a capping station (10, 11) for contemporaneously sealing a plurality of vials (F); an outlet zone (U) for conveying the vials (F) out of the operating line of the machine.

17 Claims, 6 Drawing Sheets

MACHINE FOR FILLING AND CAPPING VIALS

FIELD OF THE INVENTION

The present invention relates to the technical sector of automatic machines for filling and capping vials.

DESCRIPTION OF THE PRIOR ART

Machines are known for filling and capping vials having different layouts and used in different industrial sectors.

SUMMARY OF THE INVENTION

The aim of the present invention is to provide a machine structured for simultaneously filling and capping a plurality of vials.

A further aim of the invention is to provide a machine which enables ring-sealing of the vials once capped, should this prove necessary, without having recourse to operations that are external of the machine.

A further aim of the invention is to realize a machine which, while respective the preceding aims, is also reliable, functional and required limited maintenance while enabling a level productivity that is comparable with those obtainable with known machines.

The above aims are attained with a machine for filling and capping vials as discussed further below.

According to the invention, the machine for filling and capping vial of the invention comprises, arranged in cascade fashion:

a supply station of empty vials;

an Archimedes screw having a rotation axis parallel to a longitudinal development of the machine, supplied with the vials in arrival from the supply station, and destined to transfer the vials to an outlet thereof, at a predetermined step;

a device for disengaging a predetermined number of vials from the screw, activated in phase relation with the screw, and for transferring the vials transversally;

a comb conveyor, step-moved and designed to receive the predetermined number of vials from the device, consequently to a suitable phase relation between a velocity of the conveyor and the activation of the device;

a filling station, designed for introduction of a liquid solution contemporaneously into a plurality of vials, which plurality is equal in number to the predetermined number of vials;

a capping station for sealing a plurality of vials which is equal to the predetermined number of vials;

an outlet zone for conveying the vials out of the operating line of the machine.

BRIEF DESCRIPTION OF THE DRAWINGS

The characteristics of the invention will better emerge from the following description of a preferred embodiment of the machine, in accordance with the contents of the claims and with the aid of the accompanying figures of the drawings, in which:

DESCRIPTION OF THE PREFERRED EMBODIMENTS

The machine will be illustrated in the following with reference also to the operating steps of the machine on the vials.

Figure 1A:
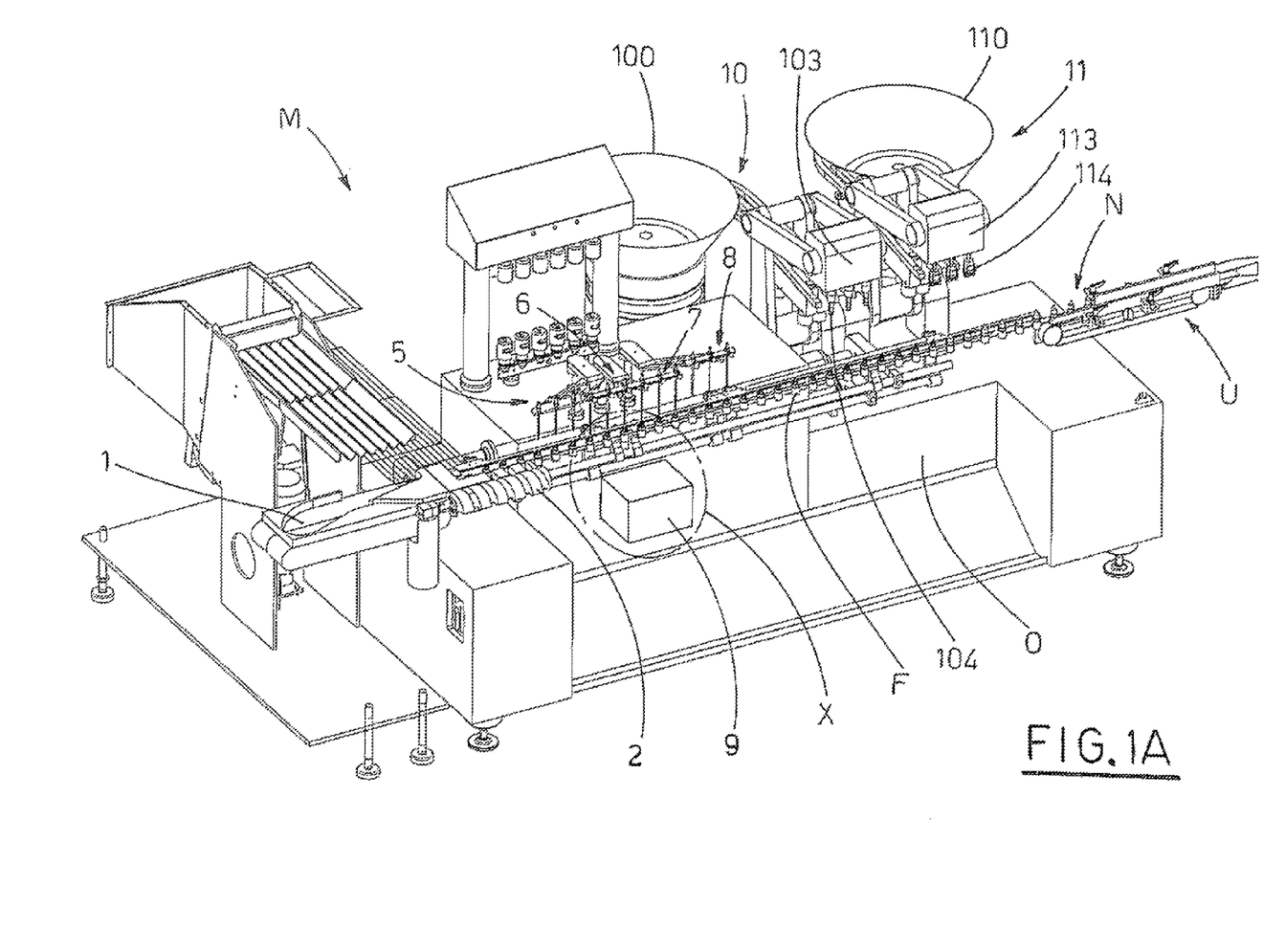
FIG. 1A is a schematic perspective view of the machine of the invention.
Figure 1B:
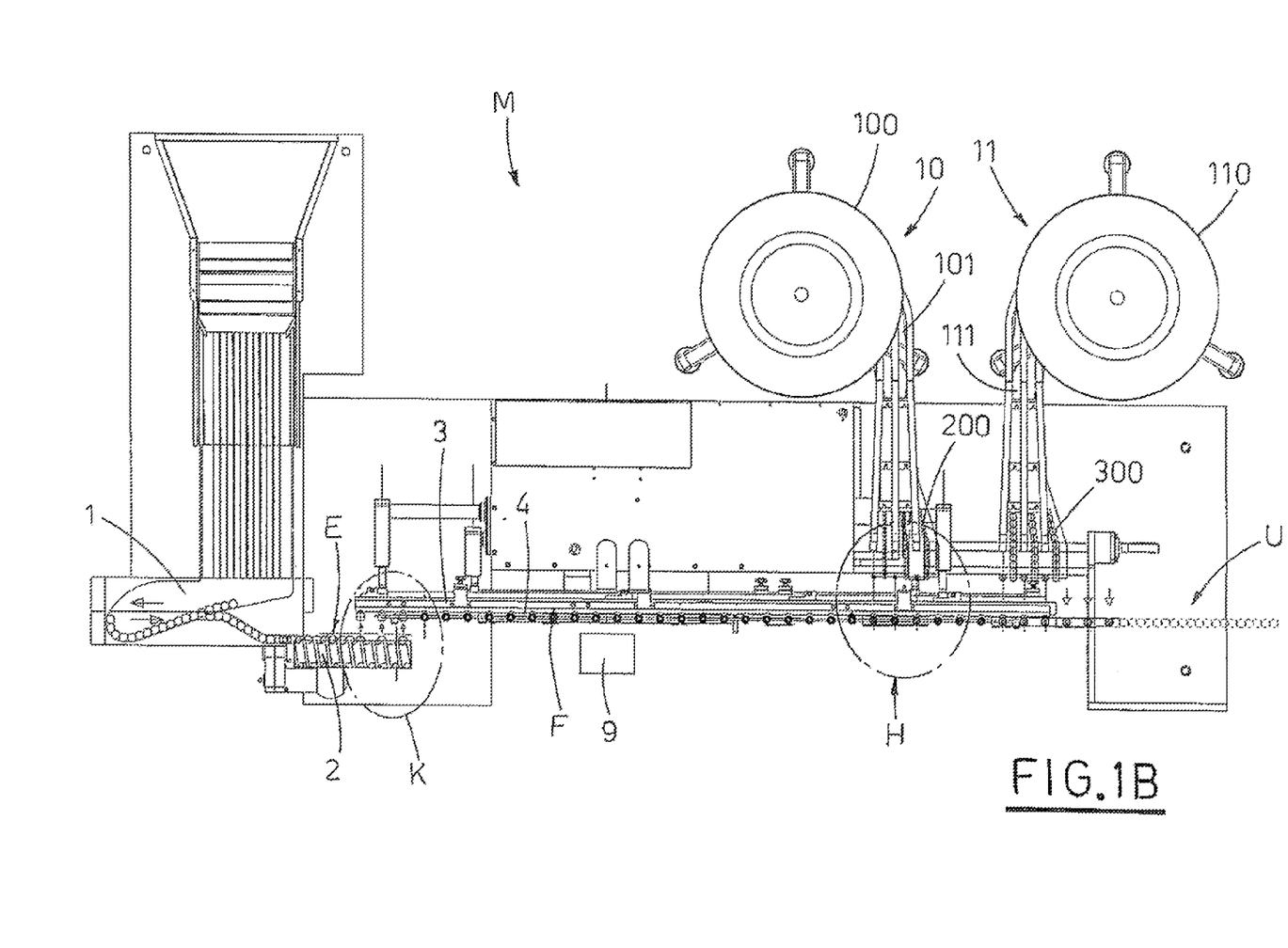
FIG. 1B is a plan view of the machine of FIG. 1A.
Figures 2, 2A:
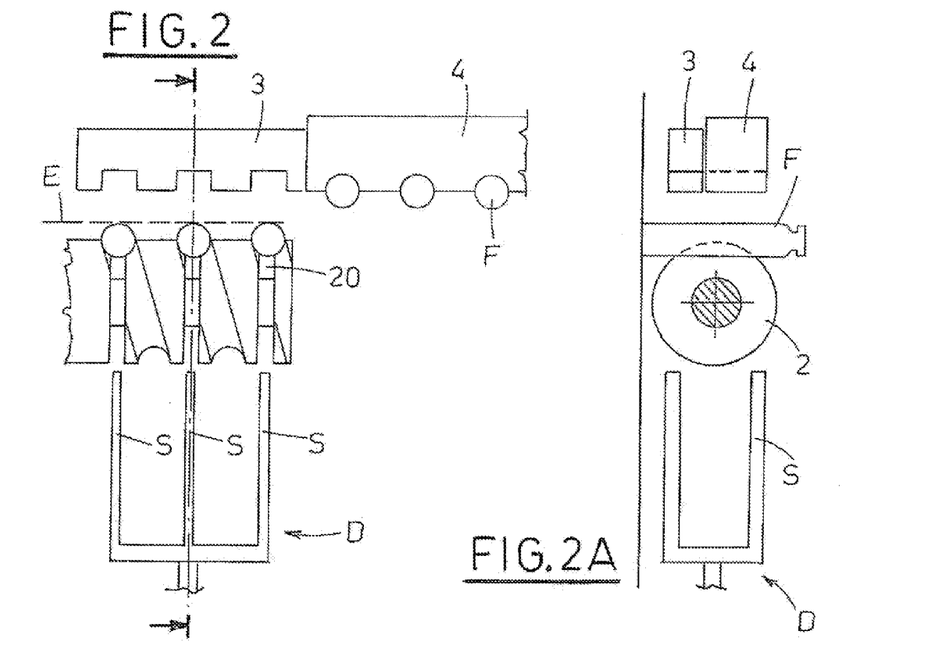
FIG. 2 is a schematic detail of a view of the detail K of FIG. 1B.
FIG. 2A is a schematic lateral view of the detail of FIG. 2.

With reference to FIGS. 1A, 1B, M denotes a machine for filling and capping the vials F of the invention.

The machine M comprises a housing bench O destined to support the various stations and movement means, which will be described in the following in greater detail.

The machine M comprises a first filling station 1, in which the empty vials F are collected and advanced towards the operating line of the machine M, having a prevalently longitudinal development. For the movement of the vials F, in the illustrated embodiment in the accompanying tables of drawings two conveyor belts, for example are used, arranged in such a way as to direct the vials F along a channel, via which they are conveyed one by one to the mouth with an Archimedes screw 2. For this purpose the screw 2 is appropriately positioned and the axis of rotation thereof is parallel to the longitudinal development of the machine M.

In movement, the screw 2 advances the vials F, supported inferiorly by a horizontal sliding plane (not illustrated). Further, with the aim of stabilizing the vials F during sliding along the horizontal plane, an abutting wall E is present (see FIG. 1B) which receives and guides the vials F, and is positioned perpendicularly with respect to the plane, and parallel to the axis of rotation of the screw 2.

In the external surface of the terminal part thereof the screw 2 exhibits a number of peripheral grooves 20, equal to the number of vials F on which work is to be done at a same time. In the illustrated preferred embodiment, three peripheral grooves 20 are present, perpendicular with respect to the rotation axis of the screw 2 and dimensioned such as to circumscribe, in depth, the nucleus of the screw 2 without involving the said nucleus (see FIGS. 2, 2A, 3, 3A).

Also present is a device D for disengaging a predetermined number of vials F from the screw 2, as will more fully be illustrated herein below. The device D comprises pusher means S, conformed such as to insert in the grooves 20, in a number which is equal to the number of vials F on which work is to be done contemporaneously. The pusher means S exhibit a forked conformation and can be moved transversally advancingly and in reverse, without obstructing the movement of the screw 2.

When three vials F reach the terminal part of the screw 2 the pusher means s are activated which, advancing transversally, insert in the grooves 20, acting on the opposite side of the screw 2 with respect to the positioning of the vials F. The pusher means S are dimensioned such as to project, once inserted in the screw 2, towards the vials F, such as to transfer them between the tines of an appropriately-arranged comb conveyor 3, as will be more fully described in the following (see FIGS. 3, 3A).

To enable transfer of the vials F from the screw 2 to the comb conveyor 3, the part of the wall E which is at the terminal part of the screw 2 (denoted in a broken line in FIG. 1B) is disappearingly vertically mobile in a downwards direction and vice versa. When the pusher means S are activated, the part of the wall E descends such as to enable the transversal movement of the vials F. Following this operation, the pusher means S withdraw transversally and the mobile part of the wall E can rise to the initial position.

The above-mentioned comb conveyor 3 extends longitudinally over the whole operating line, and is step-supplied by the screw 2 cooperating with the pusher means S.

Figure 3:
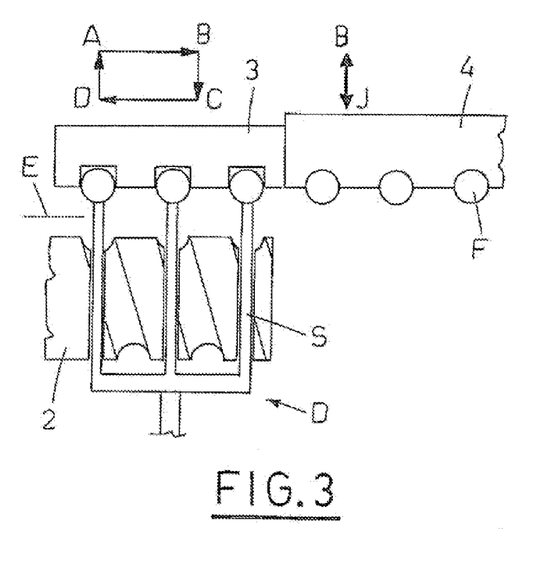
FIG. 3 is the view of FIG. 1, in a different operating situation.
Figure 3A:
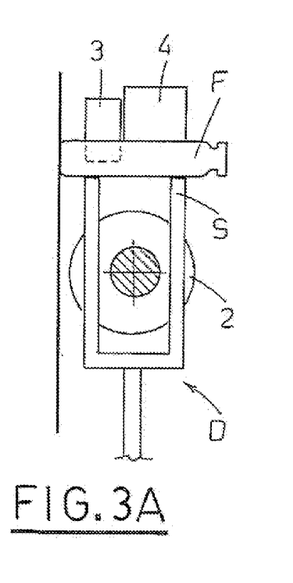
FIG. 3A is a schematic lateral view of the operating situation of FIG. 3.

The comb conveyor 3 is able to perform a plurality of movements: in the longitudinal direction from left to right (according to the development direction of the line) and vice versa, and in a vertical direction, from up in a downwards direction and vice versa. The movements are schematically represented in FIG. 3 using arrows (from A to B, from B to C, from C to D, from D to A) in a frontal view.

The comb conveyor 3, at the moment of receiving the vials F from the screw 2, rises from position D to position A, up to being at the position of the vials F, at the start of the line. With the activating of the pusher means S, the vials F are transferred between the tines of the comb conveyor 3. When the vials F have been received, the comb conveyor 3 translates longitudinally from left to right such that the first of the tines, which is at the start of the line in position A, is in a position B. The distance between points A and B, reciprocally at the same height, is equal to the run comprising the three vials F moved.

Once the first run has been made, a second centering comb 4, superposed on the comb conveyor 3, enters into play. The centering comb 4 has the same length as the comb conveyor, minus the length of a run, and develops starting from the height of point B up to the end of the line.

The centering comb 4 is able to move transversally advancingly or backwards, while always maintaining the same height. In FIG. 3, arrows (from B to J and vice versa) schematically indicate the movement of the centering comb 4 in a view from above.

Following the displacing from A to B of the comb conveyor 3, the centering comb 4, which is initially retracted, advances transversally such that the first of the tines, which was in position J, reaches position B. Thus the vials F are engaged between the tines of the centering comb 4, which stabilizes their position. Once the stability of the vials F is ensured, the comb conveyor 3 moves from above in a downwards direction such that the first of the tines on the left passes from position B to position C. The comb conveyor 3 has therefore disengaged the vials F, which remain housed only between the tines of the centering comb 4.

The comb conveyor 3 can displace longitudinally from right towards left, such that the first of the tines on the left thereof passes from position C to position D, position D being in line with point A. The distance between the points C and D is thus equal to the distance between points A and B.

At this point, the comb conveyor 3 rises vertically and returns to position A, engaging the vials F retained by the centering comb 4 between the tines.

Following a subsequent activating of the pusher means S, the comb conveyor 3 further receives the vials F supplied by the screw 2. In the moment at which the comb conveyor 3 engages the vials F between the tines, the centering comb 4 disengages them, receding from B to J.

The subsequent longitudinal displacement of the comb conveyor 3 causes all the vials F to advance by an operating step. The operating step is N times the step between two consecutive vials, with N defining the predetermined number of vials F which are to be operated on contemporaneously. The movement of the vials F then step-proceeds for the whole line, as described above.

Figure 4A:
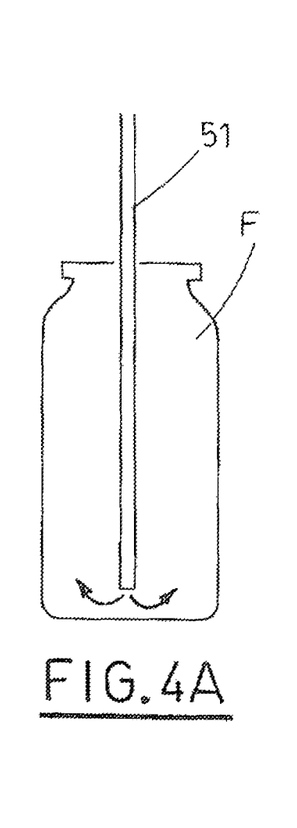
FIG. 4A schematically illustrates an injection of an inert gas into an empty vial.

After a series of displacements of the comb conveyor 3, the batch of vials comprising the first four vials F is at a (possible) first inert gas blower station 5. An inert gas is injected into the empty vial F such as to replace the air, preventing oxidation of the liquid which will be injected into it. The first blower station 5, in the preferred embodiment represented herein, comprises three immersion nozzles 51 (see FIG. 1A). The nozzles 51, moving vertically in a downwards direction up to reaching the inside of the vials F, inject the inert gas, usually helium or nitrogen. The blowing operation, schematically illustrated in FIG. 4A, is done in phase relation with the movement of the comb conveyor 3, and comprises injection of the inert gas in the period of time in which the vials F are paused. Once the gas has been injected, the nozzles 51 move vertically in an upwards direction such as to return to the starting position.

The following step consists in filling the three vials F, translated longitudinally according to the above-described operating step by the comb conveyor 3. In the preferred embodiment illustrated herein, the filling station 6, 7 comprises a first section 6 for partially filling the vials F, and a second station 7 for total filling of the vials F, arranged in a line.

Figure 4B:
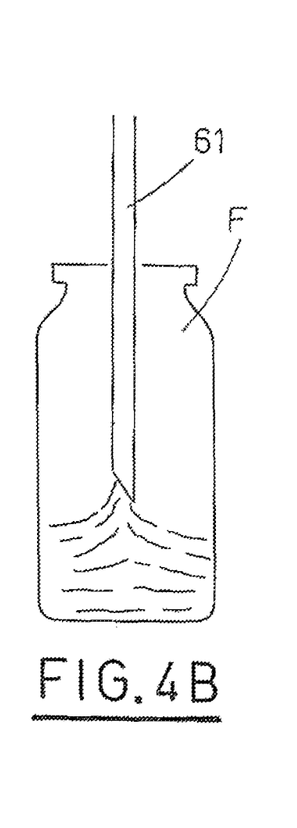
FIG. 4B schematically illustrates a partial filling of a vial with a liquid solution.

The vials F, once transferred to the first partial-filling station 6, are then partially filled by three immersion nozzles 61 which inject a liquid solution internally of the vials F up to a determined height. See FIG. 4b for a schematic representation of this.

Figure 4C:
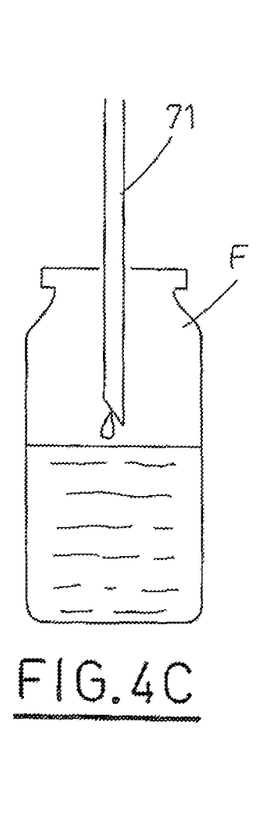
FIG. 4C schematically illustrates a total filling of a vial with a liquid solution.

As mentioned, the vials F are transferred to the second total filling station 7. Similarly to what occurred in section 6, three nozzles 71 are present which move in a downwards direction into the inside of the vials F. The nozzles remain at a height which, for example, involves no contact with the previously-introduced liquid solution; the nozzles 71 thus complete the filling of the vials F. This operation is schematically illustrated in FIG. 4C.

Figure 4D:
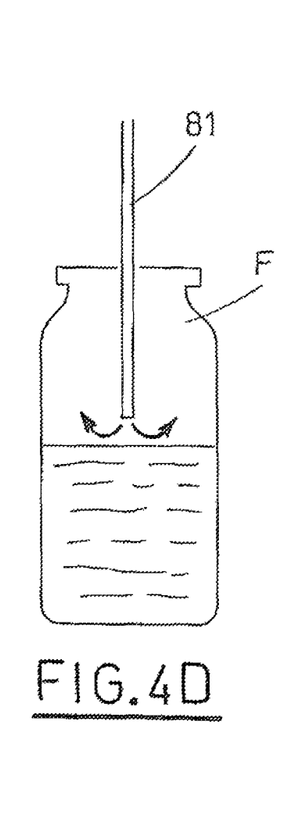
FIG. 4D schematically illustrates injection of an inert gas into a vial filled with a liquid solution.

The full vial F then pass to the second blower station 8, if present, (FIG. 4D) in which three nozzles 81 inject an inert gas into the upper part of the vials F where there is no liquid solution. The nozzles 81 in this case are maintained at a height such as not to contact the liquid solution.

Figure 6:
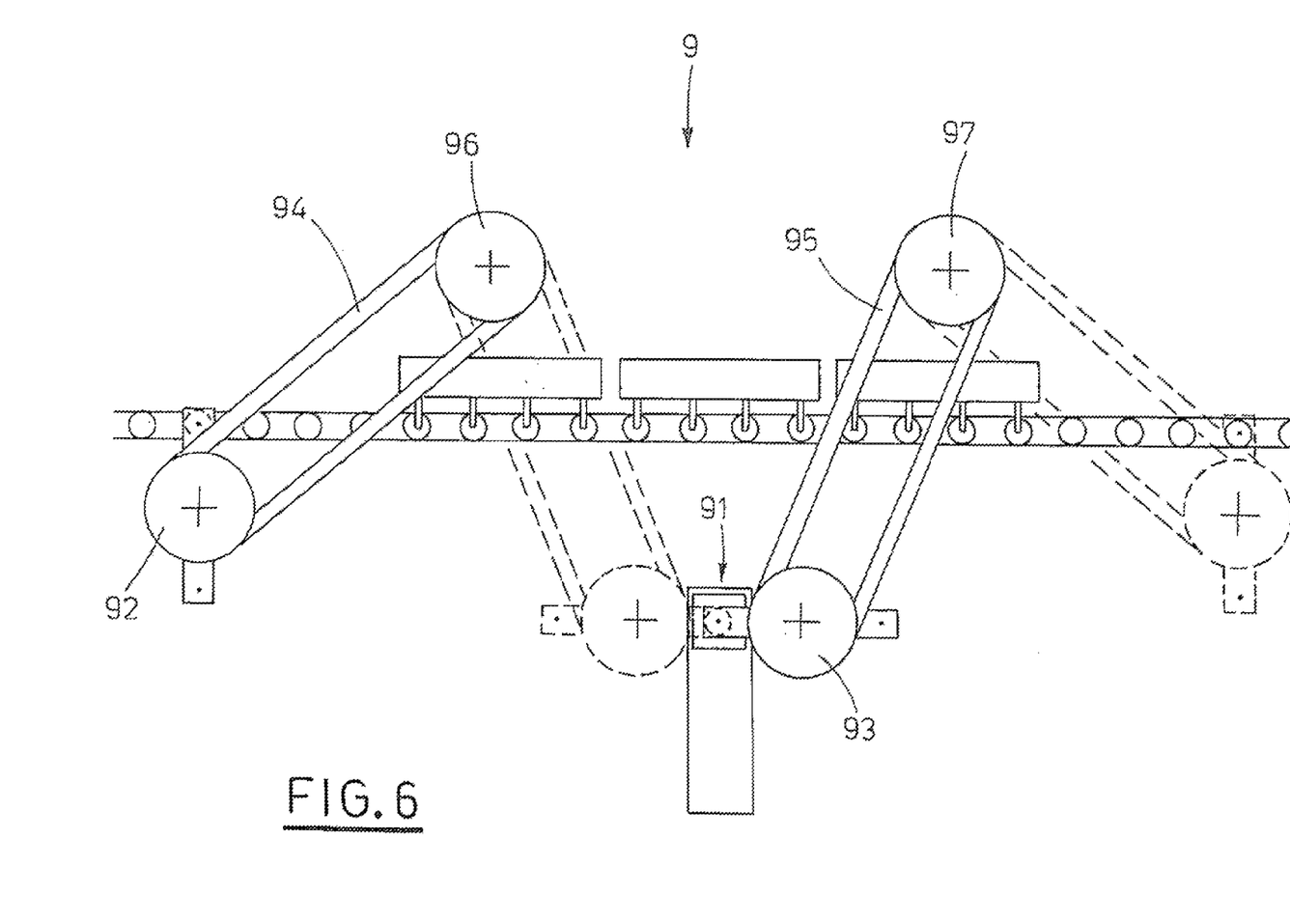
FIG. 6 is a schematically-represented detailed view of detail X of FIG. 1A.

With the aim of ensuring a precise measure of the product in the vials F, and the overall weight thereof once filled, the machine M of the invention may comprise a statistical weighing station 9. The weighing station 10 is arranged adjacent to the operating line, in proximity of the partial filling section 6 and the total filling station 7 (FIGS. 1A, 1B, 6). In the step of weighing some vials F, collected at regular intervals from the operating line of the machine M, are weighed before at the partial filling station 6 and after at the total filling station 7, without interfering with the productive capacity of the plant. This operation is performed both such as to control with precision the quantity of product injected and such as to identify any eventual vials F that may not conform to the specifications and reject them when they arrive in proximity of the line outlet.

In the preferred embodiment of the invention (in accordance with document EP 1 988 018), illustrated in FIG. 6 of the drawings, the statistical weighing station 9 of the machine M of the invention comprises a single scales 91 for weighing the vials F, situated in proximity of the operating line, on the opposite side with respect to the filling nozzles 61, 71. The weighing station 9 further comprises a first and a second pick-up-and-place member 92, 93 of vials F, the first member 92 for picking up a single vial F upstream of the first section for partial filling 6, transferring it to the weighing scales 91 and reintroducing in onto the line upstream of the first section for partial filling 6, once the tare has been measured; the second member 93 for picking up a single vial F, the tare of which has been previously weighed downstream of the filler station 8, transferring it to the weighing scales 91 and reintroducing it into the line once the gross weight has been measured, downstream of the second total filling station 7. The above-mentioned first and second pick-up-and-place members 92, 93 of the vials F are activated in phase relation and are operated by two respective oscillating arms 94, 95 which constrain them to supports 96, 97. The supports 96, 97 are arranged in proximity of the line on the opposite side with respect to the scales 91, respectively upstream of the first section for partial filling 6 and downstream of the second total filling section 7. The supports 96, 97 enable rotation of the oscillating arms 94, 95 on a horizontal plane, by means of a motor organ (not illustrated), enabling displacement of the first and second pick-up and place members 92, 93 of the vials F. Clearly, once gross weights and tares of the vials F have been taken, the net weight thereof is calculated, i.e. the weight of the liquid solution introduced.

The filled vials F then advance to be sealed, towards a capping station 10, 11. In the illustrated preferred embodiment, the capping station 10, 11 comprises a first capping station 10 and a possible second ring-sealing station 11, arranged in succession.

The first capping station 10 comprises in turn a vibrator bin 100 for storing caps 200 and a robot 103 in turn comprising handling means 104 (FIG. 1A).

The vibrator bin 100 and the robot 103 are arranged in proximity of the operating line, on the same side as the preceding blower stations 5, 8 and filling stations 6, 7.

The vibrator bin 100 directs the caps 200 towards a linear vibrator 101 comprising three tracks, one for each vial to be capped simultaneously with a further two vials, conformed such as to receive the caps 200. The three tracks enable directing the caps 200 from the vibrator bin 100 towards the operating line, arranging them in three lines.

Figure 5A:
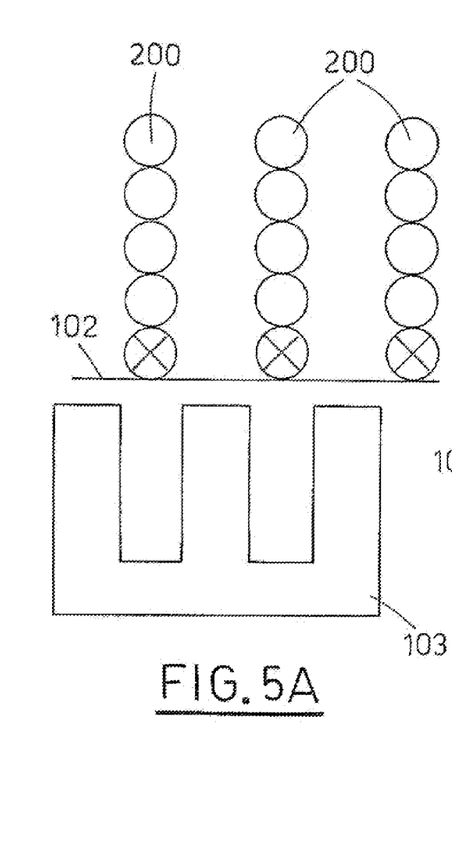
FIG. 5A is a schematic plan view of detail H of FIG. 1B.
Figure 5B:
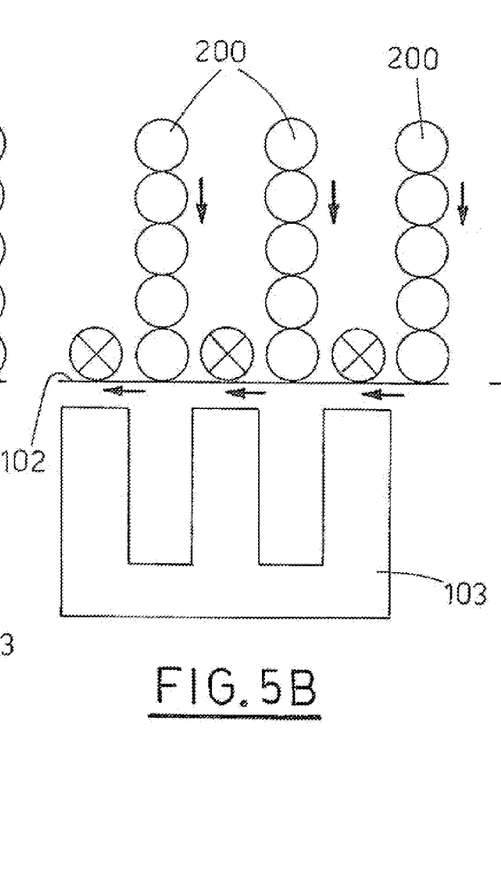
FIGS. 5B, 5C show the same view of FIG. 5A in two different operating situations.
Figure 5C:
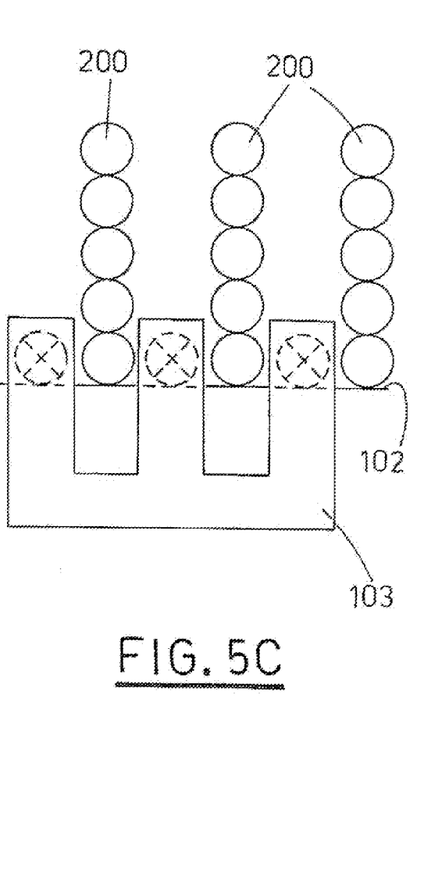

The caps 200 advance along the tracks of the linear vibrator 101 up to reaching a collecting zone, comprising an abutting wall 102. Each line stops once the first of the caps 200 of the line contacts the abutting wall 102 (see FIG. 5A). Special translator means (not illustrated) laterally move the three caps abutting with the wall 102, as schematically illustrated in FIG. 5B. At the same time, the linear vibrator 101 has advanced the lines of the caps such that the first of each line contacts the abutting wall 102.

At this point the robot 103 act via the handling means 104, collecting the three caps 200 which have been translated with respect to the three lines, arranging them on the mouth of the three vials F and sealing them.

The illustrated preferred embodiment also comprises a ring-sealing section 11, towards which the vials F advance after having been sealed.

The ring-sealing section comprises a vibrator bin 110 for the storing of collar seals 300, and a robot 113 comprising in turn special handling means 114.

The vibrator bin 110 and the robot 113 are arranged in proximity of the operating line, on the same side as the vibrator bin 100 of the capping section 10 (see FIGS. 1A, 1B). This arrangement advantageously enables having a side of the operating line that is completely free, and thus facilitates an operative's intervention, for example in a case of faulty functioning, or for performing periodical maintenance interventions on the machine M.

The vibrator bin 110 directs the collars 300 towards a linear vibrator 111, conformed entirely similarly to the linear vibrator 110 of the capping section 10. The ring-sealing of the vials F is performed by the handling means 114 which intervene on three collars 300 identically to the above-described capping operation.

The capping and ring-sealing operations are performed in phase relation with the comb conveyor 3, i.e. they are done when the vials F are paused.

On conclusion of the ring-sealing step, the sealed vials F are moved from the comb conveyor 3 towards an outlet zone U.

In the illustrated embodiment, the outlet zone U comprises, for example, a conveyor belt N, supplied by the comb conveyor 3, for conveying the vials out of the machine M.

The above-described machine M can further comprise some empty stations, arranged for example upstream of the first blower station 5 of inert gas and downstream of the second blower station 8 of inert gas, before the capping station 10, 11, as shown in the accompanying figures of the drawings.

The above-cited first and second blower stations of inert gas can be present or not in the machine, according to operating needs.

Further, by way of clarification, the machine of the present invention can comprise filling the vials in a single step, and with only the capping station of the filled vials.

As previously mentioned, means can be present (not illustrated) for rejecting vials that are considered not to conform to predetermined requisites (for example weight). These means direct the unsuitable vials to a secondary outlet of the machine.

The above has been described by way of non-limiting example, and any eventual construction variants are understood to fall within the ambit of protection of the present technical solution, as described above and claimed in the following.

The invention claimed is:

1. A machine (M) for filling and capping vials (F) comprising, arranged in a cascade fashion:
a supply station (1) of empty vials (F);
an Archimedes screw (2) having a rotation axis parallel to a longitudinal development of the machine (M), supplied with the vials (F) in arrival from the supply station (1), and destined to transfer the vials (F) to an outlet thereof, at a predetermined step;
a device (D) for disengaging a predetermined number of vials (F) from the screw (2), activated in phase relation with the screw (2), and for transferring the vials (F) transversally;
a comb conveyor (3), step-moved and designed to receive the predetermined number of vials (F) from the device (D), consequently to a suitable phase relation between a velocity of the conveyor (3) and the activation of the device (D);
a filling station (6, 7), designed for introduction of a liquid solution contemporaneously into a plurality of vials (F), which plurality is equal in number to the predetermined number of vials (F);
a capping station (10, 11) for sealing a plurality of vials (F) which is equal to the predetermined number of vials (F);

an outlet zone (U) for conveying the vials (F) out of the operating line of the machine; and, wherein the screw (2) exhibits peripheral grooves (20) which are equal in number to the predetermined number of vials (F) and parallel to one another, and in that the device (D) comprises pusher means (S) conformed such as to engage the grooves (20) and project towards the vials (F), transferring the vials (F) between the ribs of the comb conveyor (3).

2. The machine of claim 1, wherein the peripheral grooves (20) are perpendicular to the rotation axis of the screw (2).

3. The machine of claim 1, further comprising a wall (E) arranged parallel to the rotation axis of the screw (2) and in proximity of the screw (2) in order to receive and guide the vials (F), and in that the part of the wall (E) which is located at the terminal part of the screw (2) is vertically mobile from top to bottom, disappearing, and vice versa.

4. The machine of claim 1, further comprising a first blower station (5) of an inert gas internally of the empty vials (F), arranged upstream of the filling station (6, 7) of the vials (F).

5. The machine of claim 4, further comprising a second blower station (8) of an inert gas internally of the full vials (F), which second blower station (8) is arranged downstream of the filling station (6, 7) and upstream of the capping station (10, 11).

6. The machine of claim 1, wherein the filling station (6, 7) comprises:
   a first partial filling section (6) of the vials (F) for filling the vials (F) up to a determined level, and a second total filling section (7) of the vials (F).

7. The machine of claim 1, further comprising a statistical weighing station (9) of the vials (F), arranged in proximity of the filling station (6, 7) and able to detect a tare and a gross weight of sample vials (F).

8. A machine (M) for filling and capping vials (F) comprising, arranged in a cascade fashion:
   a supply station (1) of empty vials (F);
   an Archimedes screw (2) having a rotation axis parallel to a longitudinal development of the machine (M), supplied with the vials (F) in arrival from the supply station (1), and destined to transfer the vials (F) to an outlet thereof, at a predetermined step;
   a device (D) for disengaging a predetermined number of vials (F) from the screw (2), activated in phase relation with the screw (2), and for transferring the vials (F) transversally;
   a comb conveyor (3), step-moved and designed to receive the predetermined number of vials (F) from the device (D), consequently to a suitable phase relation between a velocity of the conveyor (3) and the activation of the device (D);
   a filling station (6, 7), designed for introduction of a liquid solution contemporaneously into a plurality of vials (F), which plurality is equal in number to the predetermined number of vials (F);
   a capping station (10, 11) for sealing a plurality of vials (F) which is equal to the predetermined number of vials (F);
   an outlet zone (U) for conveying the vials (F) out of the operating line of the machine; and,
   wherein the capping station (10, 11) comprises:
   a first capping station (10) for sealing the vials (F) and a second ring sealing section (11) of the capped vials (F).

9. The machine of claim 8, wherein the first capping section (10) comprises: a vibrator bin (100) for storing caps (200), a robot (103) comprising in turn handling means (104) for sealing the vials (F).

10. The machine of claim 9, wherein the second ring sealing section (11) comprises: a vibrator bin (110) for storing caps (200), a robot (113) in turn comprising handling means (114) for sealing the vials (F).

11. The machine of claim 10, wherein the vibrator bin (100) and the robot (103) of the capping section (10) are arranged on a same side of the operating line as the vibrator bin (110) and the robot (113) of the ring sealing section (11).

12. The machine of claim 8, wherein the second ring sealing section (11) comprises: a vibrator bin (110) for storing caps (200), a robot (113) in turn comprising handling means (114) for sealing the vials (F).

13. The machine of claim 8, further comprising a wall (E) arranged parallel to the rotation axis of the screw (2) and in proximity of the screw (2) in order to receive and guide the vials (F), and in that the part of the wall (E) which is located at the terminal part of the screw (2) is vertically mobile from top to bottom, disappearing, and vice versa.

14. The machine of claim 8, further comprising a first blower station (5) of an inert gas internally of the empty vials (F), arranged upstream of the filling station (6, 7) of the vials (F).

15. The machine of claim 14, further comprising a second blower station (8) of an inert gas internally of the full vials (F), which second blower station (8) is arranged downstream of the filling station (6, 7) and upstream of the capping station (10, 11).

16. The machine of claim 8, wherein the filling station (6, 7) comprises:
   a first partial filling section (6) of the vials (F) for filling the vials (F) up to a determined level, and a second total filling section (7) of the vials (F).

17. The machine of claim 8, further comprising a statistical weighing station (9) of the vials (F), arranged in proximity of the filling station (6, 7) and able to detect a tare and a gross weight of sample vials (F).

* * * * *